June 1, 1937. D. ORENSTEIN 2,082,300
MORTISE AND TENON JOINT LOCK
Filed July 10, 1935
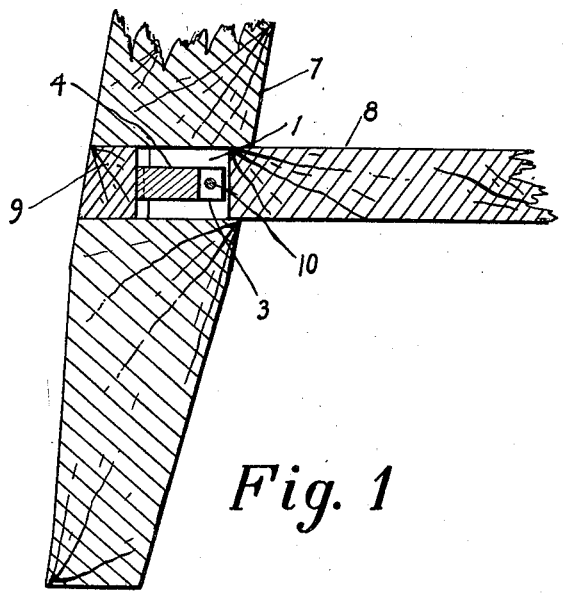
Fig. 1
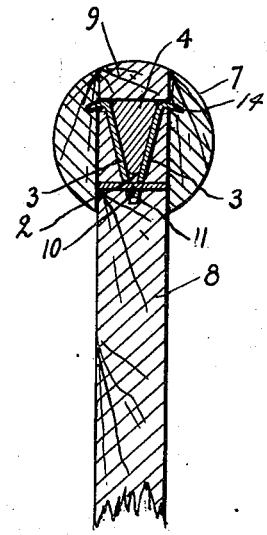
Fig. 2
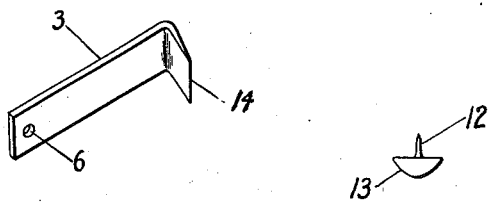
Fig. 3
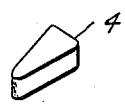
Fig. 5
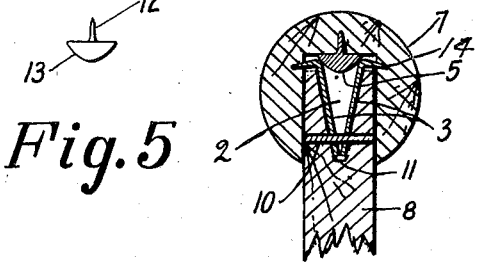
Fig. 6
Fig. 4
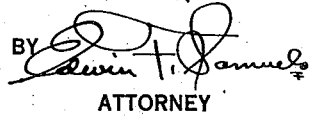
David Orenstein
INVENTOR
BY
ATTORNEY Patented June 1, 1937

2,082,300

UNITED STATES PATENT OFFICE 2,082,300

MORTISE AND TENON JOINT LOCK

David Orenstein, New York, N. Y.

Application July 10, 1935, Serial No. 30,601

4 Claims. (Cl. 20—92)

This invention relates to improvements in mortise and tenon joint lock, particularly for joining the rungs of pieces of furniture to legs or the like, and it is the principal object of my invention to provide such a lock of simple and inexpensive construction, yet durable and efficient in use as well as invisible on the outside of the furniture.

Another object of my invention is the provision of an improved means for firmly fastening the members of a mortise and tenon joint by suitable members placed into a substantially V-shaped opening in the rung and spreading these members apart by means of a wedge to embed their sharp and angularly bent upper ends into the material of the furniture leg.

A further object of my invention is the provision of a joint lock of this character using in place of a wedge a button with rounded head and having a sharp prong adapted to be driven into the furniture leg.

A still further object of my invention is the provision of a mortise and tenon joint lock for uniting the rungs of a piece of furniture with its legs not necessitating the use of glue or other like fastening material and by plugging the opening in the leg after the lock has been applied by means of a plug the outer face of which is polished to conform to the outer polished surface of the leg so as to become invisible.

These and other objects and advantages of my invention will become more fully known as the description thereof proceeds, and will then be more specifically defined in the appended claims.

In the accompanying drawing forming a material part of this disclosure:

Fig. 1 is a front elevation of a mortise and tenon joint lock constructed according to my invention.

Fig. 2 is an end elevation thereof.

Fig. 3 is a detail perspective view of a locking member.

Fig. 4 is a detail perspective view of a locking wedge.

Fig. 5 is a front elevation of a modified form of locking element.

Fig. 6 is an end elevation of a modified form of my joint lock.

As illustrated, the member 7 is an ordinary furniture leg to which a rung 8 is to be secured. A chamber 1 is provided in the member 7 for the reception of the end of rung 8 which is provided with an endwise arranged V-slot 2 against the inner walls of which the members 3 are placed. Through the openings 6 in the end members 3 a cross-pin 10 is driven. The inward movement of the members is limited by an abutment 11. A wedge 4 is then driven between members 3, and the pointed angularly bent outer ends 14 of these members are driven into the material of the member 7. A wooden plug 9 is now driven into the opening 2 to close the same. The outer face of the plug, 9, is then polished to conform to the polish of member 7, making the joint invisible.

The modified form of my invention is different from the preferred form in that knob 5 having a sharp prong 12 and a tapered head 13 is placed between the members 3 with its prong driven into the material of member 7.

To assemble the joint, the rung 8 with the opening 2 in its forward end, said opening containing the members 3 therein with the ends 14 projecting outwardly as driven into the chamber 1, bringing said members 3 into contact with the knob 5 and forcing ends 14 outwardly into the wood.

The operation of my device will be entirely clear from the above description, and it will be evident that by driving the wedge 4 between the upper ends of the members 3 their sharp angular ends will be driven into the material of the furniture leg and hold the rung 8 intimately and securely fastened thereto without the use of glue, etc.

When the chamber 1 is then plugged by plug 9 and the latter is polished on its outer face to resemble the polish of the leg, the connection will become invisible.

It will be clear that I may make many changes in my device coming within the scope of my claims without departure from the invention.

Having thus described my invention, what I claim as new and desire to secure by Letters Patent is:

1. A mortise and tenon joint lock comprising a tenon having a V-shaped recess, members engaging the inner walls of said recess, sharp, outwardly directed angular prongs at the ends of said members, means to spread said members to drive said prongs into the material of a leg formed with a mortise, a means for holding said member in place, and a means for plugging the mortise to make the joint lock invisible from the outside.

2. In a mortise and tenon joint lock, a leg provided with a mortise, a rung having an endwise arranged V-slot engaging in said mortise, means in said V-slot for anchoring said rung in the mortise, means to hold said means in place, and a plug for closing the mortise towards the outside to make the joint lock invisible on the outside.

3. In a mortise and tenon joint lock, a leg provided with a mortise, a rung having an endwise arranged V-slot, metal plates introduced into said V-slot, having upper sharp-edged angularly disposed ends, a wedge adapted to be driven between said metal plates to drive their pronged ends into the material of the mortise walls, a cross-bar passed through the lower ends of said plates, an abutment to limit the inward movement of said plates and a plug for closing the mortise against the outside.

4. In a mortise and tenon joint lock, a pair of locking plates anchored in the mortise and secured to the tenon, and a button having a tapered head and a prong forced between said plates to spread the same to anchor them in the mortise walls, holding said plates in their locking position.

DAVID ORENSTEIN.